United States Patent
Meier

(10) Patent No.: US 7,229,267 B2
(45) Date of Patent: Jun. 12, 2007

(54) TABLET PRESS

(75) Inventor: Christof Meier, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 348 days.

(21) Appl. No.: 10/865,031

(22) Filed: Jun. 10, 2004

(65) Prior Publication Data

US 2005/0003038 A1   Jan. 6, 2005

(30) Foreign Application Priority Data

Jun. 10, 2003   (DE) ................ 103 26 175

(51) Int. Cl.
*B29C 43/08*   (2006.01)

(52) U.S. Cl. ................ 425/182; 425/345; 425/353; 425/361; 100/102

(58) Field of Classification Search ............... 425/182, 425/193, 345, 353, 361; 100/102
See application file for complete search history.

(56) References Cited

U.S. PATENT DOCUMENTS 3,842,652 A * 10/1974 Yonezawa et al. ............ 310/96

6,116,889 A * 9/2000 Pagel et al. ............... 425/345
6,494,116 B2 * 12/2002 Horie ....................... 100/102
6,972,105 B2 * 12/2005 Boeckx et al. .............. 425/345

FOREIGN PATENT DOCUMENTS

| DE | 197 05 094 C1 | 7/1998 |
| JP | 11267896 A | 10/1999 |
| WO | WO 00/39037 | 7/2000 |

OTHER PUBLICATIONS

"Direktantriebstechnik drehsteif wie eine Stahlwelle", Seiten 1 bis 8, Sep. 1994; Baumüller Nürnberg.
"Direktantriebstechnik", antriebstechnik 33, 1994, No. 4, pp. 48, 50, Fritz Rainer, Götz.
VEM-Hanbuch Die Technik der elektrischen Antriebe, VEB Verlag Technik Berlin, 1979, pp. 26/27.

* cited by examiner

*Primary Examiner*—Yogendra N. Gupta
*Assistant Examiner*—Thu Khanh T. Nguyen
(74) *Attorney, Agent, or Firm*—Henry M. Feierisen

(57) ABSTRACT

A tablet press with a rotary turret that is driven by a direct drive is described. The rotary turret can be driven by a simple, inexpensive drive having low vibrations, which reduces the stress on the mechanical components and the drive train of the press.

6 Claims, 2 Drawing Sheets

TABLET PRESS

CROSS-REFERENCES TO RELATED APPLICATIONS

This application claims the priority of German Patent Application, Serial No. 103 26 175.3, filed Jun. 10, 2003, pursuant to 35 U.S.C. 119(a)–(d), the disclosure of which is incorporated herein by reference.

BACKGROUND OF THE INVENTION

The present invention relates, in general, to a tablet press, and more particularly to a tablet press of a type having a rotary turret for producing pellets.

FIG. 1 shows an exemplary configuration of a conventional tablet press. The conventional tablet press is hereby driven by a motor 2 which drives a cylindrical rotary turret 1 through a gear 4 and a toothed belt 5. The material is compressed in the rotary turret 1. The rotary turret 1 includes vertically extending bores, which are not shown in FIG. 1 for sake of clarity. The rotary turret 1 is filled via a filling unit 6 with a filling medium to be compressed to a tablet or pellet. Pressure is applied to the filling medium by way of two pressure rams via an upper idler pressure roller 7 and an additional lower idler pressure roller 8, thereby compressing the filling medium into a tablet or pellet.

FIG. 2 shows schematically the basic operating principle of the press. The rotary turret 1 is first filled by a filling unit 6. The pressing forces generated by the upper pressure roller 7 and the lower pressure roller 8 are then transferred to the filling medium 14 via an upper pressure ram 11 and a lower pressure ram 10, which for sake of clarity are only labeled once in FIG. 2, thereby compressing the filling medium 14 into the shape of a tablet. The pressed tablet is subsequently ejected.

The drive turns the rotary turret 1 so that the rotary turret 1 passes between the upper pressure roller 7 and the lower pressure roller 8 with a substantial force, thereby generating the pressing force onto the upper pressure ram 11 and the lower pressure ram 10.

Since the pressure rollers 7, 8 apply a significant force to the filling medium and the pressing force is generated at a high rate when the pressure rams pass under the pressure rollers, significant torque peaks and vibration excitations are applied to the entire mechanical system and/or to the drive train of the tablet press which includes the motor 2, the gear 4, the toothed belt 5 and the driveshaft 9. The generated mechanical vibrations place a significant load on the components of the drive train. The conventional elastic drive train can itself vibrate and thereby enhance the vibration spectrum which worsens the dynamic characteristics of the compression machine and the drive train. The large distance between rotary turret 1 and the actual motor 2 makes it difficult to produce a mechanically stiff system. Expensive mechanically damping means and complex control mechanisms may have to be employed to dampen the vibrations. Even with such complex damping arrangements, the vibration load can only be reduced so far, so that the mechanical components of the pellet press continue to be exposed to a high mechanical load.

It would therefore be desirable and advantageous to provide an improved tablet press which obviates prior art shortcomings and is able to specifically place significantly less stress on the mechanical components and the drive train of the tablet press due to vibrations.

SUMMARY OF THE INVENTION

According to one aspect of the present invention, a tablet press includes a rotary turret for compressing a material into the shape of a pellet, and a direct drive for operating the rotary turret.

The present invention resolves prior art problems by replacing a conventional drive train formed of a motor, gear, toothed belt and driveshaft with a direct drive, i.e., a drive that does not include a gear and/or a toothed belt. By employing a direct drive for driving the rotary turret, drive components such as toothed belts and gears can be entirely eliminated. Because the drive now drives the driveshaft of the rotary turret directly, the additional vibrations typically observed when drive components, such as the motor or the gear, are relatively far spaced are eliminated. Also eliminated are effects due to the excitation of vibrations by the drive that or amplification of vibrations through resonances, because a direct drive can be closely coupled on the stator side and the rotor side. Elimination of the vibrating drive train significantly improves the dynamic properties and the control characteristics of the press. The compact design of the drive train enables a more compact force transmission in the machine base, which reduces wear of the drive train over the life of the press, while also reducing the expenses associated with maintenance and service of the press. Moreover, the lower intensity of the mechanical vibrations also contributes to a significant reduction in the noise.

A particularly rigid mechanical construction can be realized by connecting the rotary turret with the direct drive via a driveshaft.

Advantageously, the driveshaft and the motor of the direct drive can be implemented as a single component. This reduces the number of components of the drive.

According to another feature of the present invention, the driveshaft and the rotary turret can be connected by a releasable coupling. In this way, the rotary turret can be easily attached to and removed from the driveshaft.

According to another feature of the present invention, a vibration-damping coupling can be placed between the driveshaft and the rotary turret. Such vibration-damping coupling between driveshaft and rotary turret not only reduces the severity of the vibrations, but can also dampen other residual vibrations.

According to another feature of the present invention, a vibration-damping coupling can be provided between the stator of the direct drive and the machine bed. Such vibration-damping coupling between the stator and the direct drive of the machine bed represents an additional vibration-damping measure.

Advantageously, the direct drive can be implemented as a torque motor, which is commonly used as a direct drive.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
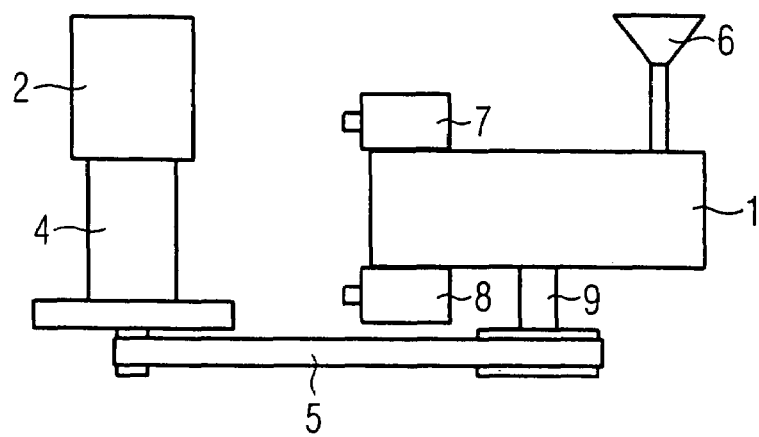
FIG. 1 is a schematic illustration of a conventional tablet press.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the tablet press of the present invention, a conventional drive train formed of a motor, gear, toothed belt and driveshaft is replaced with a direct drive, i.e., a drive that does not include a gear and/or a toothed belt.

Figure 2:
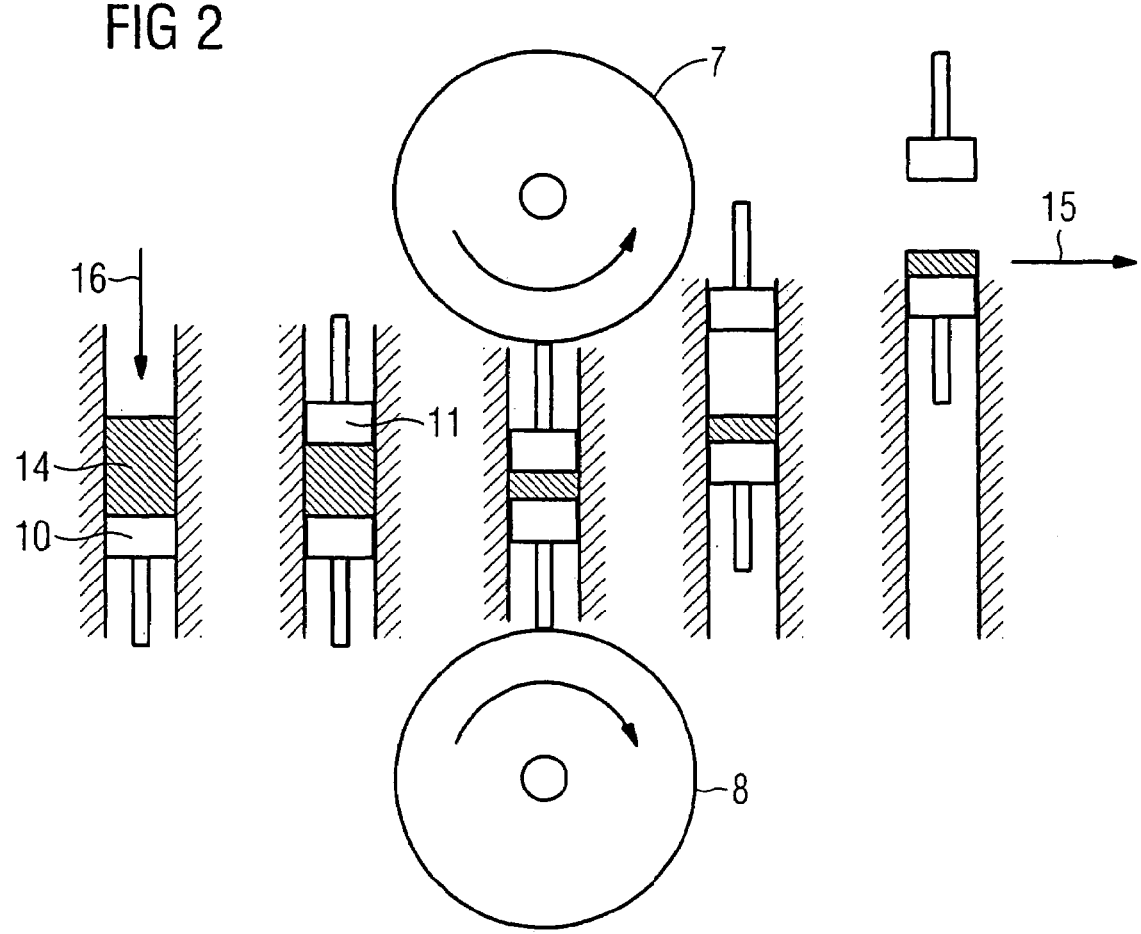
FIG. 2 is a detailed diagram of a pressing operation.
Figure 3:
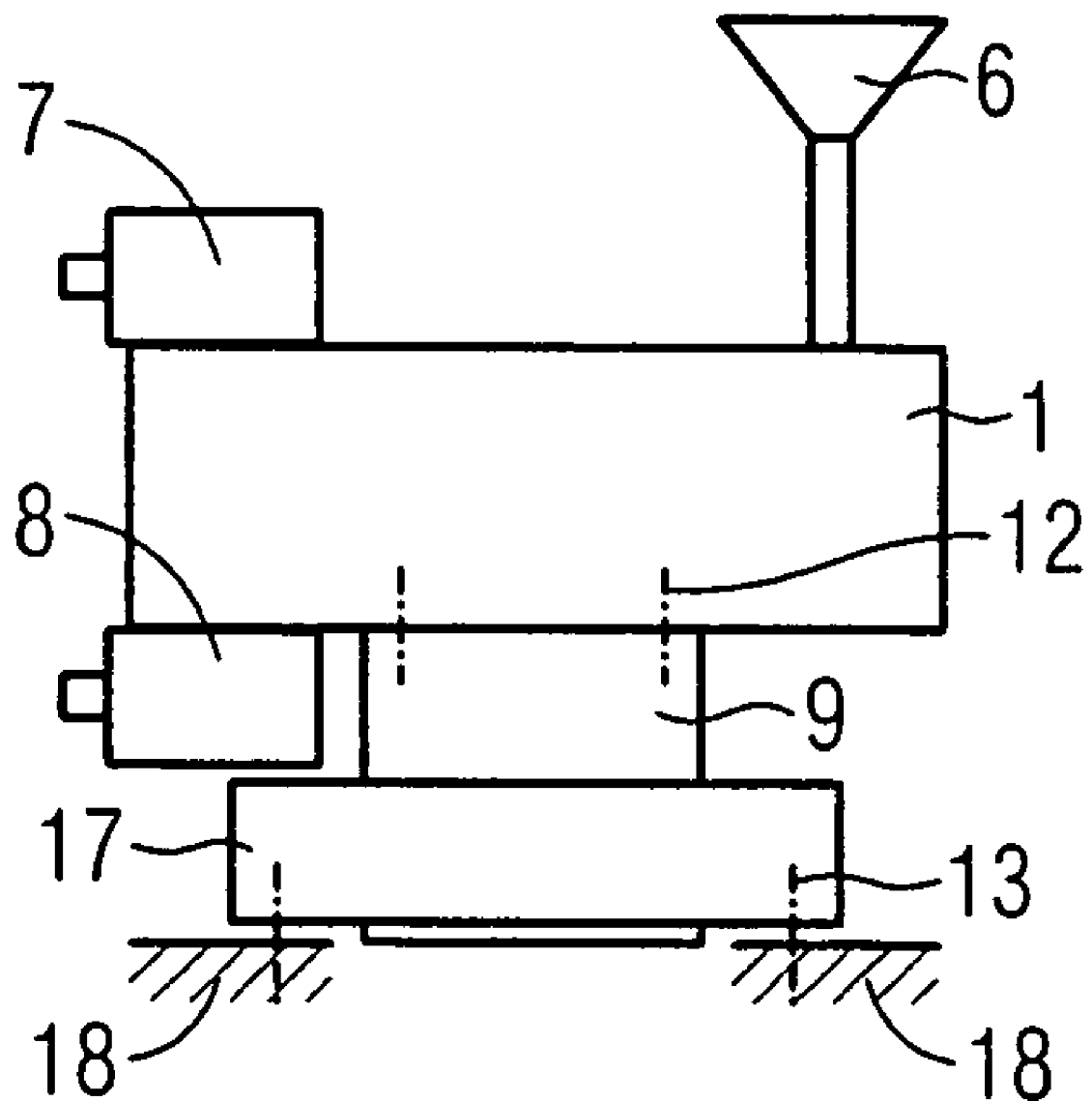
FIG. 3 is a schematic illustration of a tablet press according to the present invention.

Turning now to the drawing, and in particular to FIG. 3, there is shown an exemplary schematic embodiment of a tablet press according to the invention. The rotary turret 1 is filled by a filling unit 6 with a filling medium to be compressed. The pressure required for the compression is applied via the upper idler pressure roller 7 and the lower idler pressure roller 8 through pressure rams which are not shown for sake of clarity. In all other aspects, the mechanical compression process and the operation of the press correspond to that of the conventional presses depicted in FIG. 1 and FIG. 2, respectively.

Unlike the conventional tablet press depicted in FIG. 1, the tablet press according to the invention employs an entirely novel drive concept for tablet press. The rotary turret 1, which rotates between the two pressure rollers 7 and 8, is no longer driven, as in FIG. 1, indirectly via a gear and a toothed belt 5, but is rather driven by a direct drive. This eliminates the need for drive components, such as a toothed belt and a gear. The overall force transmission via the driveshaft 9 and the stator 17 of the direct drive to the machine bed 18 is also significantly more compact and stiffer.

The rotary turret 1 is herein connected via a coupling 12 (indicated by two dotted lines) with the driveshaft 9, whereby only one of the dotted lines has the reference numeral 12. The coupling 12 between the rotary turret 1 and the driveshaft 9 can also be releasable, by which the rotary turret 1 can be easily attached to and removed from the driveshaft 9. Advantageously, the driveshaft 9 and the rotor of the direct drive in the depicted embodiment form a single component, so that the driveshaft 9 in this embodiment is an integral component of the rotor of the direct drive. Accordingly, only a very small number of mechanical components are required to drive the rotary turret 1. The driveshaft 9 and/or the rotor of the direct drive are rotatably supported in the stator 17 of the direct drive. The direct drive is hence composed of the stator 17 and a rotor, which in the depicted embodiments is also implemented as the driveshaft 9. It will be understood that the driveshaft 9 and the rotor of the direct drive can also be fabricated as two separate components.

The stator 17 of the direct drive is connected with the machine bed 18 via a coupling 13. The coupling 13 is indicated in FIG. 3 by two dotted lines, whereby only one of the dotted line has the reference numeral 13.

The coupling 12 and/or the coupling 13 can also be made, for example, of a screw connection that is supported by a vibration-damping support.

The rotary turret 1 is directly driven by the rotor of the direct drive implemented as the driveshaft 9. The compact and rigid construction of the drive of the rotary turret significantly reduces and often completely eliminates mechanical vibrations.

In the depicted embodiment, the direct drive is implemented as a torque motor, because torque motors tend to generate a high torque at a relatively low rotation speed. However, other types of direct-driven motors or direct drives can also be used.

It should be mentioned that the term "tablet" and "pellet" are used interchangeably. Accordingly, the aforedescribed press can produce tablets as well as pellets, which are used, for example, for producing food, feedstock, combustion products and the like. It should also be mentioned that the cylindrical rotary turret is only one possible embodiment of such rotary turret and that other turret shapes of are feasible.

Moreover, the pressure to be applied to the filling medium can not only be produced by two pressing rollers and pressing rams, but by other means known in the art, such as hydraulic actuators. However, those embodiments that lack a direct drive still have problems with strong mechanical vibrations.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A tablet press, comprising:
   a rotary turret for compressing a material into the shape of a tablet; and
   a direct drive for operating the rotary turret, said direct drive having a motor which includes a stator, a rotor interacting with the stator, and a driveshaft which is connected detachably to the rotary turret and is mounted rigidly to the rotor for establishing a direct linkage of the drive with the rotary turret.

2. The tablet press of claim 1, wherein the driveshaft and the rotor form a unitary structure.

3. The tablet press of claim 1, wherein the driveshaft and the rotary turret are coupled by a releasable coupling.

4. The tablet press of claim 1, further comprising a vibration-dampening coupling disposed between the driveshaft and the rotary turret.

5. The tablet press of claim 1, further comprising a machine bed, wherein the direct drive comprises a vibration-dampening coupling disposed between the stator and the machine bed.

6. The tablet press of claim 1, wherein the motor of the direct drive is implemented as a torque motor.

* * * * *